(12) United States Patent
Gonzalez Leon

(10) Patent No.: US 12,552,725 B2
(45) Date of Patent: Feb. 17, 2026

(54) USE OF A LIQUID COMPOSITION FOR COATING PARTICLES

(71) Applicant: Arkema France, Colombes (FR)

(72) Inventor: Juan Antonio Gonzalez Leon, Lyons (FR)

(73) Assignee: Arkema France, Puteaux (FR)

( * ) Notice: Subject to any disclaimer, the term of this patent is extended or adjusted under 35 U.S.C. 154(b) by 928 days.

(21) Appl. No.: 17/414,574

(22) PCT Filed: Dec. 18, 2019

(86) PCT No.: PCT/FR2019/053169
§ 371 (c)(1),
(2) Date: Jun. 16, 2021

(87) PCT Pub. No.: WO2020/128336
PCT Pub. Date: Jun. 25, 2020

(65) Prior Publication Data
US 2022/0055958 A1    Feb. 24, 2022

(30) Foreign Application Priority Data

Dec. 20, 2018 (FR) ...................................... 1873590

(51) Int. Cl.
*C05B 7/00* (2006.01)
*C05B 19/00* (2006.01)
*C05G 5/30* (2020.01)

(52) U.S. Cl.
CPC ............... *C05B 7/00* (2013.01); *C05B 19/00* (2013.01); *C05G 5/38* (2020.02); *C01P 2004/50* (2013.01)

(58) Field of Classification Search
CPC .. C05B 7/00; C05B 19/00; C05G 5/38; C05G 5/30; C01P 2004/50; A23K 20/158; A23K 40/10; A23K 40/30
See application file for complete search history.

(56) References Cited

U.S. PATENT DOCUMENTS

| | | |
|---|---|---|
| 8,932,490 B2 | 1/2015 | Martinez et al. |
| 10,093,590 B2 | 10/2018 | Hayes |
| 2006/0040049 A1 | 2/2006 | Spence |
| 2016/0229763 A1 | 8/2016 | Wheeler et al. |

FOREIGN PATENT DOCUMENTS

| | | | |
|---|---|---|---|
| BR | 102015020091 A2 | | 2/2017 |
| EP | 1390322 B1 | | 5/2006 |
| ES | 2319367 A1 | | 5/2009 |
| JP | 0624885 A | | 2/1994 |
| KR | 20160036539 A | * | 4/2014 |
| NZ | 588174 A | | 12/2011 |
| WO | 02090295 A1 | | 11/2002 |

OTHER PUBLICATIONS

Hlaváč, Peter, Monika Božiková, and Ana Petrović. "Selected physical properties assessment of sunflower and olive oils." Acta Technologica Agriculturae 22.3 (2019): 86-91. (Year: 2019).*
International Search Report and Written Opinion for International Application No. PCT/FR2019/053169, dated Apr. 24, 2020, 9 pages.

* cited by examiner

*Primary Examiner* — Jennifer A Smith
(74) *Attorney, Agent, or Firm* — Buchanan Ingersoll & Rooney PC

(57) ABSTRACT

The present invention relates to the use of a liquid formulation for coating granular materials, said formulation comprising at least one oil a renewable origin and at least one anionic surfactant comprising at least one functional group having one or more heteroatom(s), the electronegativity of which is strictly less than 2.5. The present invention further relates to the granular material coated with said liquid formulation.

5 Claims, No Drawings

USE OF A LIQUID COMPOSITION FOR COATING PARTICLES

CROSS-REFERENCE TO RELATED APPLICATIONS

This is the national phase of International Application No. PCT/FR2019/053169, filed 18 Dec. 2019, which claims priority to French Application No. FR 1873590, filed 20 Dec. 2018. The disclosure of each of these applications is incorporated herein by reference in its entirety for all purposes.

FIELD OF THE INVENTION

The present invention relates to the field of coating compositions applied to granular materials such as granular fertilizers, in order to improve their quality and to obtain easier, longer and safer storage.

According to the invention, a granular material is a discrete solid particle which may be produced by many different chemical or mechanical processes in which one or more components are consolidated.

BACKGROUND OF THE INVENTION

Fertilizers are materials which provide one or more of the nutrients required for the correct development and growth of plants. These can be, for example, chemical or mineral fertilizers, manure or plant residues. Fertilizers are usually in the form of granular materials, as this facilitates their storage, transport and use in the fields. There are many known processes for preparing fertilizers in the form of a granular material, such as granulation, crystallization, crushing, grinding, prilling and compacting, among others.

However, fertilizers in granular form often have a tendency to agglomerate and can form aggregates or agglomerates which prevent the flow of the individual granules. This makes their transport and use much more difficult, or even impossible. In addition, fertilizers in granular form may also produce moderate to high amounts of dust when they are transported, unloaded or transferred. Atmospheres containing amounts of fine dust may be dangerous and very frequently cause serious health and safety problems.

The agglomeration and the generation of dust by fertilizers in granular form may generally be reduced and even avoided by methods which are already known, for example when the granules are coated. Such coatings are generally sprayed onto the fertilizer granules at the end of their production process. The coated fertilizers are then stored for a certain amount of time or transported to another site where they are stored or applied. These coatings are generally based on petroleum-based components, for example mineral oils and waxes which may contain other components, such as surfactants, to improve their performance.

Although the performance of such coatings is well known in the industry, since they are currently used to solve the problem of dust generation and of agglomeration, the true effect of these petroleum-based components on the soils where the fertilizers are applied has to be taken into account. Specifically, mineral oils and waxes originating from petrochemical sources may exhibit a certain toxicity if they are not correctly purified or processed. In addition, they are generally considered as being non-biodegradable, which means that they may accumulate in the soils over the years, which leads to negative impacts on crop growth.

The idea of replacing the mineral oils and waxes in fertilizer coatings has already been considered in the past in order to reduce the effect of the agglomeration thereof during storage and to reduce the dust generated by the fertilizers.

For example, EP1390322-B1 describes an agricultural composition comprising a wax and an oil, these possibly being of animal, fish or vegetable origin, a resin and a polymer. It is claimed that it protects a nitrate-based fertilizer against agglomeration and the formation of dust. The coatings described show that high amounts of mineral wax are necessary, as well as a resin and optionally a synthetic polymer, to obtain the desired fertilizer protection. The resulting formulations are solid or pasty at ambient temperature and consequently must be heated for application to the fertilizer particles.

US10093590-B2 claims a process for reducing agglomeration in a solid fertilizer by the particular combination of propylene glycol and ethyl lactate. While the composition is claimed to be liquid at ambient temperature, so as to be easier to apply to the fertilizer granules, a large amount of such a composition is necessary to achieve the desired effect. In addition, ethyl lactate has a relatively low flash point of 46° C., which limits the safety of using such a type of formulation.

The published application BR102015020091 claims the use of a composition comprising an alkylphenol oxide surfactant with an oil, which may be a mineral or vegetable oil. No mention is made of the physical state of the resulting composition, but a relatively high amount of the claimed surfactant, i.e. 15% to 40% of the formulation, appears to be necessary to achieve the desired effect. The effect which results is to reduce dust generation, no effect on reducing agglomeration being described.

ES2319367-B1 claims the use of a composition comprising salts of alkyl phosphate esters with trialkylamines in order to avoid the agglomeration of granulated fertilizers. The composition described may be prepared in combination with various vegetable oils. However, in the examples, the melting point of the compositions according to the invention is described as being greater than 49° C. in all cases and, consequently, these compositions must be heated in order to be applied to the fertilizer particles.

US2006040049-A1 claims a fertilizer coating for the protection against agglomeration and dust, comprising a metal salt of a fatty acid in a combination of fatty acid esters. The fatty acid metal salt described is dispersed in various liquids such as mineral or vegetable oils. The resulting compositions are, however, solid at ambient temperature, with melting points of greater than 60° C., and, consequently, they have to be heated in order to be applied to the fertilizer particles.

In many of these examples, in order to achieve the desired effect of protection against agglomeration or dust, the resulting formulations comprising oils of vegetable or animal origin are solid at ambient temperature, which makes direct application thereof to the granulated particles impossible without prior melting. In certain cases, the liquid compositions described in the prior art documents only display protection against dust and not protection against agglomeration, or lead to potential safety risks.

The actual technical problem is that the majority of the coating formulations comprising oils of renewable origin which confer protection against agglomeration and dust upon the fertilizer granules are practically impossible to apply at ambient temperature. As described in the prior art, conventional coating formulations have to be melted or at least heated before being applied to the granules.

Consequently, it is of practical interest to propose alternative methods for avoiding the drawbacks of the known techniques mentioned above while at the same time producing coatings of oil of renewable origin for granular materials in order to effectively reduce the tendency thereof towards agglomeration and towards dust formation.

SUMMARY OF THE INVENTION

A first objective of the present invention is to propose coating formulations comprising oils of renewable origin which confer protection against agglomeration and dust upon the granular materials, and in particular upon fertilizer granules, and which may be applied in the liquid state at ambient temperature.

Another objective of the present invention is the use of components which enable, at relatively low doses, easy preparation of formulations with various oils of renewable origin which may be used as coatings for granular materials.

According to another additional objective of the invention, the formulations of the present invention are used and are effective under the same storage and application conditions as the currently known fertilizer coatings.

DETAILED DESCRIPTION OF THE INVENTION

The present invention is not limited to the coating of fertilizers, but is also suitable for another medium requiring coating, such as minerals, cereals, flours, medicaments, a ceramic, mineral aggregates from quarries and any other particulate product which has a tendency to agglomerate and/or to generate dust.

It has now been discovered that these objectives are completely or at least partially achieved with the specific formulation of the present invention. Aside from the objectives mentioned above, others will become apparent in the following description of the present invention.

Consequently, a first subject of the present invention is the use of a liquid formulation for coating granular materials, said formulation comprising at least one oil of renewable origin and at least one anionic surfactant comprising at least one functional group having one or more heteroatoms, the electronegativity of which is strictly less than 2.5.

The term "surfactant" in the context of the present description denotes a compound which contains at least one hydrophobic group and at least one hydrophilic group. The term "anionic surfactant" denotes a surfactant in which the hydrophilic group is anionic, which means that it can become negatively charged, for example in the presence of a base.

In the context of the present invention, "electronegativity" is as defined by A. L. Alfred and E. G. Rochow (*J. Inorg. Nucl. Chem.*, 5, (1958), p. 264). Nonlimiting examples of suitable heteroatoms the electronegativity of which is strictly less than 2.5 include a phosphorus atom, a sulfur atom, a boron atom, and the like.

According to a preferred embodiment of the present invention, the functional group is an anionic functional group which can become negatively charged, for example in the presence of a base. Other preferred examples of suitable functional groups include phosphate groups, sulfate groups and sulfonate groups.

The liquid formulation of the present invention, which comprises both at least one specific anionic surfactant and at least one oil of renewable origin, is particularly useful for coating granular fertilizer materials in order to prevent agglomeration and the generation of dust.

In the context of the invention, an "oil of renewable origin" denotes an oil originating from a renewable origin, as opposed to a fossil origin, and preferably from vegetable or animal origins. The oil of renewable origin may originate from a direct extraction, from an intermediate step of such an extraction process, and also from a secondary product, such as a distillate, or a byproduct in the process of obtaining the oil from a given source, and the like. It may also be a mixture of several such oils. Oil and mixtures of oils are denoted simply by "oil" in the present description.

Preferably, the oil of renewable origin for use in the present invention is an oil of vegetable origins. More preferably, the oil of renewable origin is liquid at temperatures above 10° C., advantageously above 20° C.

Preferably, the viscosity of the oil of renewable origin at 20° C. is between 2 mPa·s and 1500 mPa·s, limits included, as measured by means of a dynamic shear rheometer with parallel plate geometry at a shear rate of 80 s$^{-1}$. Even more preferably, the oil of renewable origin has an iodine number of between 70 and 150 as measured by titration methods, as described in ASTM D5768-02.

The oil of renewable origin may be used as is or in a modified form, for example in its partially or completely hydrogenated form. Mixtures of oils of renewable origin may also be used in the present invention.

Preferred examples of oils of renewable origin include almond oil, avocado oil, cottonseed oil, cashew nut oil, grapeseed oil, hazelnut oil, rice bran oil, linseed oil, peanut oil, colza oil, sesame oil, sunflower oil, coconut oil, palm oil, palm kernel oil, corn oil, canola oil, soybean oil, olive oil and an oil derived from a papermaking process, such as tall oil. The oils mentioned may be in crude form, for example may originate from mechanical or solvent extraction steps, from an intermediate refining or separation step, from a chemical modification step or from a final refining process.

Preferably, the anionic surfactant is present in a weight ratio of from 0.01 to 0.43, limits included, relative to the oil of renewable origin, more preferably in a weight ratio of from 0.02 to 0.33, limits included, relative to the oil of renewable origin, and more preferably still in a weight ratio of from 0.03 to 0.11, limits included, relative to the oil of renewable origin.

In a preferred embodiment of the present invention, the anionic surfactant comprises a compound comprising at least one phosphate group, one sulfonate group or one sulfate group. According to another preferred embodiment, the anionic surfactant comprises at least one phosphate group.

Consequently, and according to a preferred embodiment of the present invention, the anionic surfactant comprises at least one compound of formula (1):

$$[R^1\text{-}A\text{-}(B)_n]\text{-}G \qquad (1)$$

in which
R$^1$ represents a linear or branched, saturated or unsaturated, C$_1$-C$_{30}$, preferably C$_2$-C$_{30}$, preferably C$_4$-C$_{30}$, more preferably C$_6$-C$_{30}$, advantageously C$_6$-C$_{20}$, hydrocarbon chain optionally containing at least one aromatic ring,
A represents a bond or an oxygen atom,
(B)$_n$ represents a bond or a sequence of one or more alkylene oxide repeating units, selected from ethylene oxide, propylene oxide, butylene oxide and mixtures of these, and n is an integer between 1 and 100, preferably between 1 and 50, more preferably between 3 and 40, limits included, m represents an integer of from 1 to 3, limits included, G is selected from formula (2) and formula (3):

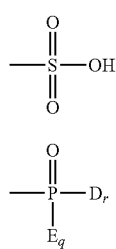

Formula (2)

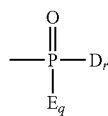

(Formula 3)

D represents —O—(F)$_v$—R$^2$, in which
  R$^2$ represents a hydrogen atom or a linear or branched, saturated or unsaturated, C$_1$-C$_{30}$, preferably C$_2$-C$_{30}$, preferably C$_4$-C$_{30}$, more preferably C$_6$-C$_{30}$, advantageously C$_6$-C$_{20}$, hydrocarbon chain optionally containing at least one aromatic ring, and
  (F)$_v$ represents a bond or a sequence of one or more alkylene oxide repeating units, selected from ethylene oxide, propylene oxide, butylene oxide and mixtures of these, and v is an integer between 1 and 100, preferably between 1 and 50, more preferably between 3 and 40, limits included, E represents —O-[J]$_s$-R$^3$,
  R$^3$ represents a hydrogen atom or a linear or branched, saturated or unsaturated, C$_1$-C$_{30}$, preferably C$_2$-C$_{30}$, preferably C$_4$-C$_{30}$, more preferably C$_6$-C$_{30}$, advantageously C$_6$-C$_{20}$, hydrocarbon chain optionally containing at least one aromatic ring, and
  (J)$_s$ represents a bond or a sequence of one or more alkylene oxide repeating units, selected from ethylene oxide, propylene oxide, butylene oxide and mixtures of these, and s is an integer between 1 and 100, preferably between 1 and 50, more preferably between 3 and 40, limits included, and
  q and r each represent integers selected from 0, 1 and 2, with the proviso that m+q+r=3.

According to the present invention, an "ethylene oxide group" is understood to be the ethylene oxide repeating unit resulting from the opening of an oxirane ring.

According to the present invention, a "propylene oxide group" is understood to be the propylene oxide repeating unit resulting from the opening of a methyloxirane ring.

According to the present invention, a "butylene oxide group" is understood to be the butylene oxide repeating unit resulting from the opening of a 2-ethyloxirane ring.

Preferably, when the compound of formula (1) comprises one or more sequences of one or more alkylene oxide repeating units, said repeating units may be present in a random or alternating manner or in blocks.

In one embodiment, the preferred compounds of formula (1) are those in which m is equal to 1 and D and E each represent an —OH group.

In another embodiment, preferred compounds of formula (1) are those in which m is equal to 2 and at least one of D or E represents an —OH group.

In another additional embodiment, preferred compounds of formula (1) are those in which v and s have the same value.

According to another embodiment, preferred compounds of formula (1) are those in which:
  R$^1$ represents a linear or branched, saturated or unsaturated, C$_6$-C$_{20}$ hydrocarbon chain,
  A represents a oxygen atom,
  (B)$_n$ represents a sequence of one or more alkylene oxide repeating units, selected from ethylene oxide, propylene oxide, butylene oxide and mixtures of these, and n has a value of between 3 and 15, limits included,
  G represents the group of formula (3) in which q is 0, r is 1 or 2, D represents the —OH group, and
  m is 1 or 2, with the proviso that m+r+q=3.

According to another additional embodiment, preferred compounds of formula (1) are those in which:
  R$^1$ represents a linear or branched, saturated or unsaturated, C$_6$-C$_{20}$ hydrocarbon chain,
  A represents an oxygen atom,
  (B)$_n$ represents a bond, and
  G represents the group of formula (3) in which q is 0, r is 1 or 2, D represents the —OH group, and
  m is 1 or 2, with the proviso that m+r+q=3.

According to another additional embodiment, preferred compounds of formula (1) are those in which:
  R$^1$ represents a linear or branched, saturated or unsaturated, C$_6$-C$_{20}$ hydrocarbon chain,
  A represents an oxygen atom,
  (B)$_n$ represents a sequence of one or more alkylene oxide repeating units, selected from ethylene oxide, propylene oxide, butylene oxide and mixtures of these, and n has a value of between 3 and 15, and
  G represents the group of formula (2).

According to another additional embodiment, preferred compounds of formula (1) are those in which:
  R$^1$ represents a linear or branched, saturated or unsaturated, C$_6$-C$_{20}$ hydrocarbon chain,
  A represents a bond,
  (B)$_n$ represents a bond, and
  G represents the group of formula (2).

According to a preferred embodiment of the present invention, the anionic surfactant is a monoethoxylated alkyl ester phosphate or a diethoxylated alkyl ester phosphate.

According to another preferred embodiment of the present invention, the anionic surfactant is selected from a monoalkyl ester phosphate and a dialkyl ester phosphate.

According to another preferred embodiment of the present invention, the anionic surfactant is an ethoxylated alkyl sulfate.

According to another additional preferred embodiment of the present invention, the anionic surfactant is an alkylaryl sulfonate.

In another preferred embodiment of the present invention, the liquid coating composition comprises an alkoxylated alkyl ester phosphate and a vegetable oil.

In another additional preferred embodiment of the present invention, the liquid coating composition comprises an ethoxylated alkyl sulfate and a vegetable oil.

In another additional preferred embodiment of the present invention, the liquid coating composition comprises an alkylaryl sulfonate and a vegetable oil.

The liquid coating composition of the present invention may additionally comprise one or more other components, such as for example one or more of these, such as additives, fillers and the like, and which are commonly used in the art, such components possibly and advantageously being selected from:
  antiagglomerating agents, and preferably antiagglomerating surfactants such as alkylamines, fatty acids, alkyl phosphoric esters, alkyl ether phosphoric esters, linear alkyl alcohols, alkoxylated alkyl sulfates, alkyl ether sulfates, alkoxylated alkyl sulfonates, alkyl ether sulfonates and combinations thereof, preferably salts of alkylamines with alkyl phosphoric esters, rheology modifiers such as biodegradable or non-biodegradable polymers, waxes, preferably waxes of renewable origins, mineral origins, or synthetic waxes, such as Fischer-Tropsch waxes, resins, such as rosin acids, or modified rosin acids, tall oil pitch, pine tar pitch, pine rosins, tall oil rosins, amidoamides, alkylamidoamides, hydrophobicizing agents such as linear alkyl alcohols or macrocrystalline waxes, dispersing agents such as oils of mineral origins, dyes, UV tracers, pigments, mineral and/or organic micronutrients and trace elements which may be, but preferably are, finely dispersed and/or compatibilized, for example metal complexes, biostimulants, such as mineral or organic materials and substances which are added to improve or maintain the biological functions of soils, animals and plants, pesticides, such as insecticides, herbicides, fungicides, nematicides and the like, bacteria, yeasts, fungi, viruses, antioxidants, for example tert-butylhydroquinone (also known as TBHQ), preservatives, UV stabilizers, odor masking agents, anti-odorants, aromas, fragrances, and also mixtures of two or more of the components listed above.

Preferably, the anionic surfactant is a liquid at ambient temperature and, more preferably, the viscosity of the anionic surfactant at 25° C. is between 2 mPa·s and 5000 mPa·s, limits included, as measured by means of a dynamic shear rheometer with parallel plate geometry at a shear rate of 80 s$^{-1}$.

Preferably, the anionic surfactant which is mixed with the oil of renewable origin is used at doses of between 1% by weight and 30% by weight, more preferably between 1% by weight and 25% by weight, even more preferably between 2% by weight and 20% by weight, and even more preferably between 2% by weight and 15% by weight, advantageously between 3% by weight and 10% by weight, limits included, relative to the oil of renewable origin.

The liquid coating formulation for use in the present invention may comprise one or more oils of renewable origin and one or more anionic surfactants, as described above.

The liquid coating formulation obtained can be used in several different fields of application and exhibits particularly effective use as a coating for granules of fertilizer, or other mineral products, in order to reduce and even avoid the agglomeration of such fertilizer particles. The liquid coating formulations of the present invention may also be very useful for their anti-dust properties, in particular when they are used as a coating for granules of fertilizer, or other mineral products.

Consequently, and as indicated above, the present invention relates to the use of the liquid coating formulation described above for coating a granular material, where the granular material may be any granular material known in the art, such as those selected from, as nonlimiting examples, fertilizers, coal, mineral ores, mineral aggregates, sulfur, wood chips, sludge, granulated wastes, medicaments, cereals, granulated animal feeds, and the like, and more preferably the granular material is a fertilizer.

In the context of the invention, "fertilizer" is a particle of inorganic and/or organic material which provides the soil and/or the crops with mineral and/or organic nutrients or other substances which enhance their growth. The fertilizer particles may originate from any known process for producing fertilizers, such as granulation, grinding, mixing or formulating, compacting or prilling.

Preferably, the fertilizer particles comprise nitrates, such as ammonium nitrates, nitrophosphates, ammonium phosphate sulfate, ammonium sulfate, calcium ammonium nitrates, calcium nitrate, diammonium phosphate, potassium chloride, monoammonium phosphate, muriate of potash, sulfate of potash, sulfate of potash magnesia, single superphosphate, triple superphosphate, urea, sulfur, polyhalite and other complex or composite fertilizers containing several elements, and for example those known under the acronym NPK.

The composition of the present invention may be applied using any coating process known to those skilled in the art or according to similar common processes used for coating particles, such as those used for granulated fertilizers, such as for example according to known spray coating techniques. This may be performed using a batch or continuous process. For example, the granulated fertilizer may be introduced into a rotary coating drum while the coating is applied via one or more pressurized nozzles. The coating may also be sprayed while the granulated fertilizer rotates on an inclined granulation drum or is within a fluidized bed chamber.

The step of coating with the liquid coating formulation of the present invention may be performed before, and/or simultaneously with, and/or after, operation(s) of coating of another material, such as for example coating of additional nutrients or biological functions which are useful for the soils or the animals or the plants, coating of antiagglomerating agents such as for example clays (for example a kaolin), talc, and the like.

Once applied to the surface of a granular material, the amount of liquid coating formulation coated onto the granular material may vary within high proportions and is, advantageously and preferably, between 0.01% by weight and 10% by weight, more preferably between 0.02% by weight and 2% by weight, limits included, relative to the total mass of the coated granular material.

The present invention further relates to the granular material coated with the liquid formulation of the present invention. Once applied to the surface of a granular material (for example, and preferably, a fertilizer granule), it has been shown that the liquid formulation of the present invention is effective for achieving one or more of the following objectives:

reducing or avoiding the agglomeration of the coated particles, reducing or avoiding the release of dust from the coated particles, reducing or avoiding the absorption of moisture into the coated particles, binding other mineral or organic particles to the coated particle.

According to a preferred embodiment, the present invention relates to a fertilizer granule coated with a liquid formulation of the present invention. According to another preferred embodiment, the granular material, for example a fertilizer granule, is coated with a liquid formulation of the present invention, which amounts between 0.01% by weight and 10% by weight, more preferably between 0.02% by weight and 2% by weight, advantageously between 0.1% by weight and 1% by weight, limits included, relative to the total mass of the coated granular material.

The liquid formulation of the present invention makes it possible to obtain coated particles, preferably of fertilizer, having one or more of the advantages below, among which it is possible to mention:
- no chemical reaction occurs between the liquid and the coated particle,
- the liquid coating is not a polymer (European legislation is in the process of changing in order to reduce/eliminate the use of polymers in fertilizers),
- the liquid forming agent is used at very low concentrations (the oil of renewable origin is then the major and more economical component of the gel formulation),
- compatibility with several types of oils of renewable origin, such as refined or crude oils or distillation residues,
- the coating process is the same as the current processes known in the art for coating particles (same spraying/coating equipment, same spraying temperatures).

The liquid formulation of the present invention may be used in various other fields of application and is particularly suitable for the coating of particles which have a tendency to aggregate or to agglomerate and/or to generate dust, such as cereals, flours, medicaments, ceramics, mineral aggregates from quarries, and the like.

It is compatible with other commonly used fertilizer coating components such as surfactants, alcohols, waxes, etc.

The invention is further illustrated below by the following examples, which are presented as embodiments of the invention only, without bringing about any limitation of the scope of protection as defined by the appended claims.

EXAMPLES

Example 1

A composition A according to the invention is prepared by mixing 47.5 g of degummed soybean oil from Cefetra and 2.5 g of an alkoxylated phosphate ester surfactant, comprising a hydrocarbon chain with 16 to 18 carbon atoms and 4.5 ethylene oxide units (Surfaline® PE684 from ARKEMA), with stirring. Degumming is a well-known refining process in which the impurities in soybean oil, in particular the phosphatides or gums, are removed from the crude vegetable oil. Once the second component has been incorporated, the stirring is stopped. Composition A is clear and is liquid at ambient temperature.

Another composition, comparative composition B, is prepared by mixing 47.5 g of degummed soybean oil from Cefetra and 2.5 g of oleic acid (sold, for example, by VWR under the reference 20447-293) with stirring. Once the second component has been incorporated, the stirring is stopped. Composition B is clear and is liquid at ambient temperature.

The viscosities of the compositions prepared are measured by means of an Anton Paar MCR301 dynamic shear rheometer with a 50 mm parallel plate geometry (PP50), between 50° C. and 10° C. at a shear rate of 80 $s^{-1}$, to obtain a value of 46.9 mPas at 25° C. for composition A and 43.1 mPas for comparative composition B.

The two formulations prepared are liquid at ambient temperature, their properties in terms of protection against agglomeration and dust are evaluated in the following examples.

Example 2

The following tests are conducted in order to evaluate the tendency towards agglomeration of a coated sample of diammonium phosphate (DAP) after having been subjected to temperature and pressure and during transport.

Composition A of example 1 (according to the invention) is used as coating on the DAP granules. Similarly, soybean oil (degummed as described above) and a composition B, prepared as described in example 1, are also evaluated for agglomeration as a comparative example at the same dose. 500 g of DAP granules are heated at 40° C. for 4 hours before being mixed in an open-end laboratory coating drum and sprayed with 0.75 g of coating formulation sample, at 90° C.

An accelerated agglomeration test is conducted with the coated samples. Metal molds are filled with 150 g of coated DAP granules, closed and subjected to 3 bar of constant pneumatic pressure for 3 days. The temperature of the samples is maintained at 40° C. for the whole 3 days. Three samples are prepared for each coated sample. An uncoated sample is also evaluated for comparison.

At the end of the three days, the molds are carefully opened and compressed in a universal compression machine (Instron 3365). The force at break of the samples is recorded in each case. Table 1 shows the integral values of the results obtained for each coating (force at break in kilograms-force, kgf).

TABLE 1

| Agglomeration of coated fertilizers | | |
|---|---|---|
| | Force at break (kgf) | Standard deviation of the force at break |
| Uncoated | 64 | 5 |
| Soybean oil (reference) | 33 | 3 |
| Composition A | 25 | 3 |
| Composition B | 34 | 6 |

It can be observed that the surfactant in composition A significantly improves the protection against agglomeration conferred by the soybean oil on its own. Composition B, containing the same soybean oil, but with a different anionic surfactant, does not improve the protection against agglomeration at all.

Example 3

The following tests are conducted in order to evaluate the amount of dust generated by the same sample of DAP coated in example 1 during transport. The tests are conducted using a Microtrack optical dust measuring instrument. A sample of 300 g of coated fertilizer is introduced into the instrument and the dust generated by the deposition (due to impact after the drop) is recorded by optical methods for 60 seconds. The amount of dust generated is proportional to the integral of the measured optical signal (arbitrary units) as a function of the measurement time.

The value of the integral allows a comparison to be made between coatings, the best coating being the one having the lowest value. The coated DAP granules are stored in a closed container at 40° C. for 7 days before being evaluated for dust formation.

Table 2 shows the integral values of the dust test for each coating (integral of the optical signal values).

TABLE 2

Dust generated by coated fertilizers

|  | Dust generated |
| --- | --- |
| Uncoated | 3.07 |
| Soybean oil (reference) | 0.38 |
| Composition A | 0.05 |
| Composition B | 0.62 |

Although all of the solutions evaluated produce some degree of protection against dust, composition A exhibits the best dust protection values (lowest level of dust generated after simulated storage). The value is significantly better than the same soybean oil on its own, and the composition which contains a different surfactant (composition B).

Example 4

A composition C according to the invention is prepared by mixing 45 g of degummed soybean oil from Cefetra and 5 g of an alkoxylated phosphate ester surfactant, comprising a hydrocarbon chain with 16 to 18 carbon atoms and 4.5 ethylene oxide units (Surfaline® PE684 from ARKEMA), with stirring. Degumming is a well-known refining process in which the impurities in soybean oil, in particular the phosphatides or gums, are removed from the crude vegetable oil. Once the second component has been incorporated, the stirring is stopped. Composition C is clear and is liquid at ambient temperature.

Another composition, comparative composition D, is prepared by mixing 47.5 g of mineral oil having a kinematic viscosity at 40° C. of between 130 and 220 mm$^2$/s (sold by Colas under the name 700S) and 2.5 g of a fatty amine sold under the name Noram SH by ARKEMA at 60° C. After 10 minutes of stirring, the formulation is cooled. Composition D is cloudy and pasty at ambient temperature.

The viscosities of the compositions prepared are measured by means of an Anton Paar MCR301 dynamic shear rheometer with a 50 mm parallel plate geometry (PP50), between 50° C. and 10° C. at a shear rate of 80 s$^{-1}$, to obtain a value of 51.1 mPas at 25° C. for composition C and 172 mPas for comparative composition D.

Tests are conducted in order to evaluate the tendency towards agglomeration of coated ammonium nitrate (CAN) samples after having been subjected to temperature and pressure and during transport.

Compositions C, according to the invention, and comparative composition D are used as a coating on the CAN granules. 500 g of CAN granules are heated at 40° C. for 4 hours before being mixed in an open-end laboratory coating drum and sprayed with 0.1 g of coating formulation sample, at 90° C. and 0.3 g of talc (from Luzenac). An accelerated agglomeration test is conducted with the coated samples. Metal molds are filled with 150 g of coated CAN granules, closed and subjected to 3 bar of constant pneumatic pressure for 1 day. The temperature of the samples is maintained at 40° C. for the whole day.

Three samples are prepared for each coated sample. An uncoated sample is also evaluated for comparison. At the end of this day, the molds are carefully opened and compressed in a universal compression machine (Instron 3365). The force at break of the samples is recorded in each case. Table 3 shows the integral values of the results obtained for each coating (force at break in kilograms-force, kgf).

TABLE 3

Agglomeration of coated fertilizers

|  | Force at break (kgf) | Standard deviation of the force at break |
| --- | --- | --- |
| Uncoated | 90 | 18 |
| Composition C | 2.5 | 0.8 |
| Composition D | 1.8 | 0.7 |

It can be observed that the surfactant in composition C, according to the invention, significantly reduces the force required to break the agglomerate formed. The value obtained is similar to that obtained with a commonly used antiagglomerating cationic coating formulation (comparative composition D).

The invention claimed is:

1. A method for reducing agglomeration of a granular material, the method comprising contacting a surface of the granular material with a liquid formulation consisting of at least one oil of renewable origin and at least one anionic surfactant comprising at least one functional group having one or more heteroatoms, the electronegativity of which is less than 2.5,
   wherein the anionic surfactant is present in a weight ratio of from 0.01 to 0.43, limits included, relative to the oil of renewable origin, and
   wherein the anionic surfactant consists of at least one compound of formula (1):

$$[R^1\text{-}A\text{-}(B)_n]_m\text{-}G \quad (1)$$

wherein:
$R^1$ represents a linear or branched, saturated or unsaturated, $C_1$-$C_{30}$ hydrocarbon chain optionally containing at least one aromatic ring,
A represents a bond or an oxygen atom,
$(B)_n$ represents a bond or a sequence of one or more alkylene oxide repeating units, selected from ethylene oxide, propylene oxide, butylene oxide and mixtures of these, and n is an integer between 1 and 100, limits included,
m represents an integer of from 1 to 3, limits included,
G is of formula (3):

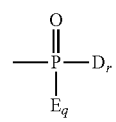

(Formula 3)

D represents —O—$(F)_v$—$R^2$, wherein
$R^2$ represents a hydrogen atom or a linear or branched, saturated or unsaturated, $C_1$-$C_{30}$ hydrocarbon chain optionally containing at least one aromatic ring, and
$(F)_v$ represents a bond or a sequence of one or more alkylene oxide repeating units, selected from ethylene oxide, propylene oxide, butylene oxide and mixtures of these, and v is an integer between 1 and 100, limits included,
E represents —O-$[J]_s$-$R^3$,
$R^3$ represents a hydrogen atom or a linear or branched, saturated or unsaturated, $C_1$-$C_{30}$ hydrocarbon chain optionally containing at least one aromatic ring, and
$(J)_s$ represents a bond or a sequence of one or more alkylene oxide repeating units, selected from ethylene oxide, propylene oxide, butylene oxide and mixtures of these, and s is an integer between 1 and 100, limits included, and q and r each represent integers selected from 0, 1 and 2, with the proviso that m+q+r=3, wherein the viscosity of the oil of renewable origin at 20° C. is between 2 mPa·s and 1500 mPas, limits included, as measured by means of a dynamic shear rheometer with parallel plate geometry at a shear rate of 80 $s^{-1}$, wherein the oil of renewable origin is selected from almond oil, avocado oil, cottonseed oil, cashew nut oil, grapeseed oil, hazelnut oil, rice bran oil, linseed oil, peanut oil, colza oil, sesame oil, sunflower oil, coconut oil, palm oil, palm kernel oil, corn oil, canola oil, soybean oil, olive oil and an oil derived from a papermaking process, and wherein the liquid formulation is present on the surface in an amount between 0.02% by weight and 2% by weight, limits included, relative to the total mass of the granular material containing the liquid formulation.

2. The method as claimed in claim 1, wherein the anionic surfactant is one selected from a monoalkyl ester phosphate, a dialkyl ester phosphate, a monoethoxylated alkyl ester phosphate, and a diethoxylated alkyl ester phosphate.

3. The method as claimed in claim 1, wherein the anionic surfactant which is mixed with the oil of renewable origin is used at doses of between 1% by weight and 30% by weight, limits included, relative to the oil of renewable origin.

4. The method as claimed in claim 1, wherein the granular material is a fertilizer.

5. The method as claimed in claim 1, wherein the granular material is a fertilizer selected from nitrates, nitrophosphates, ammonium phosphate sulfate, ammonium sulfate, calcium ammonium nitrates, calcium nitrate, diammonium phosphate, potassium chloride, monoammonium phosphate, muriate of potash, sulfate of potash, sulfate of potash magnesia, single superphosphate, triple superphosphate, urea, sulfur, polyhalite and other complex or composite fertilizers containing several elements, and those known under the acronym NPK.

\* \* \* \* \*